United States Patent [19]
Knox

[11] 4,052,020
[45] Oct. 4, 1977

[54] COMPUTER TAPE REEL

[76] Inventor: Jon A. Knox, 4625 E. Vista St., Long Beach, Calif. 90803

[21] Appl. No.: 618,392

[22] Filed: Oct. 1, 1975

[51] Int. Cl.² ........................................... B65H 75/18
[52] U.S. Cl. ................................................. 242/71.8
[58] Field of Search ................. 242/71.8, 118.4, 118.7, 242/118.8

[56] References Cited

U.S. PATENT DOCUMENTS

| | | | |
|---|---|---|---|
| 3,088,689 | 5/1963 | Perlini | 242/71.8 |
| 3,327,960 | 6/1967 | Hedin | 242/71.8 |
| 3,346,211 | 10/1967 | Gruber | 242/71.8 |

FOREIGN PATENT DOCUMENTS 1,020,579  2/1966  United Kingdom ................ 242/71.8

Primary Examiner—Edward J. McCarthy
Attorney, Agent, or Firm—Ronald L. Juniper

[57] ABSTRACT

A reel for storing computer tape comprising an annular hub and two annular flanges wherein the hub is formed by molding a thin somewhat elastic plastic hub sleeve about the outside cylindrical surface of an I-beam sectioned rigid annular hub core.

16 Claims, 10 Drawing Figures

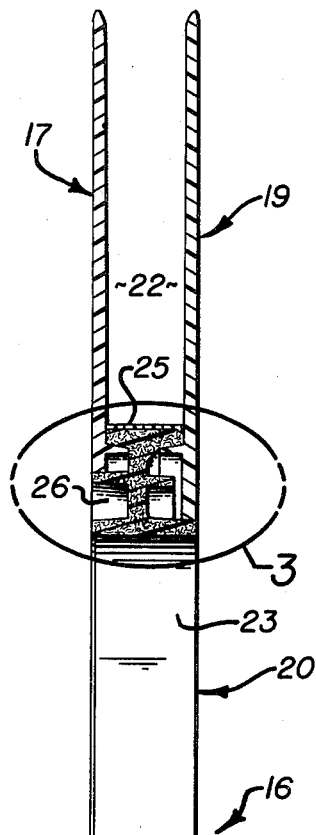
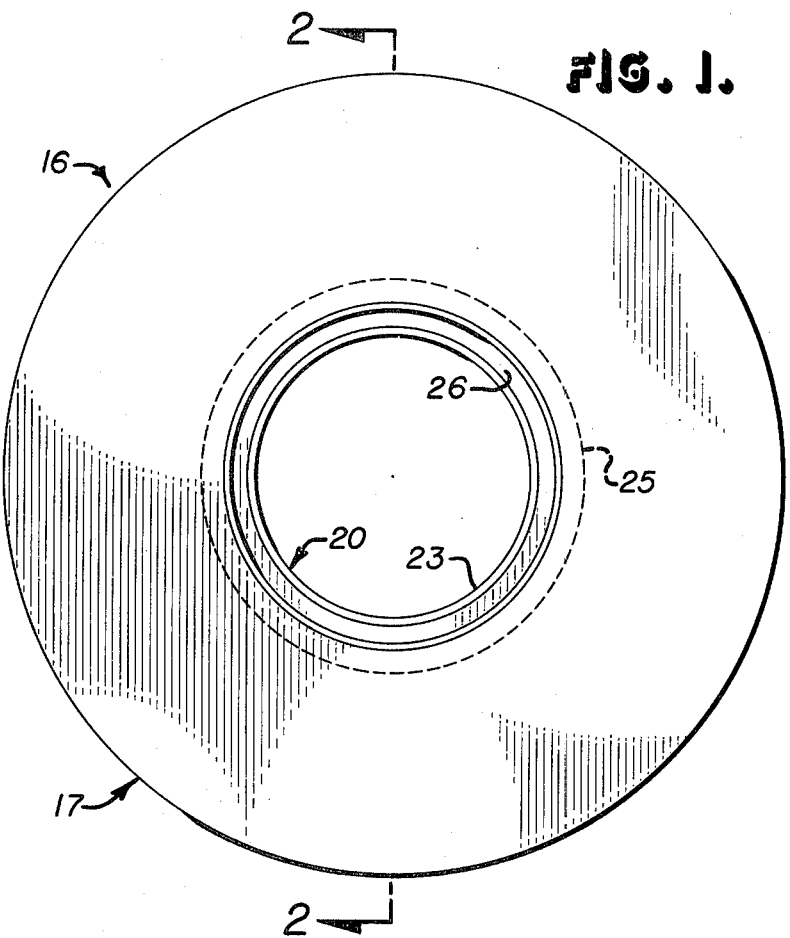
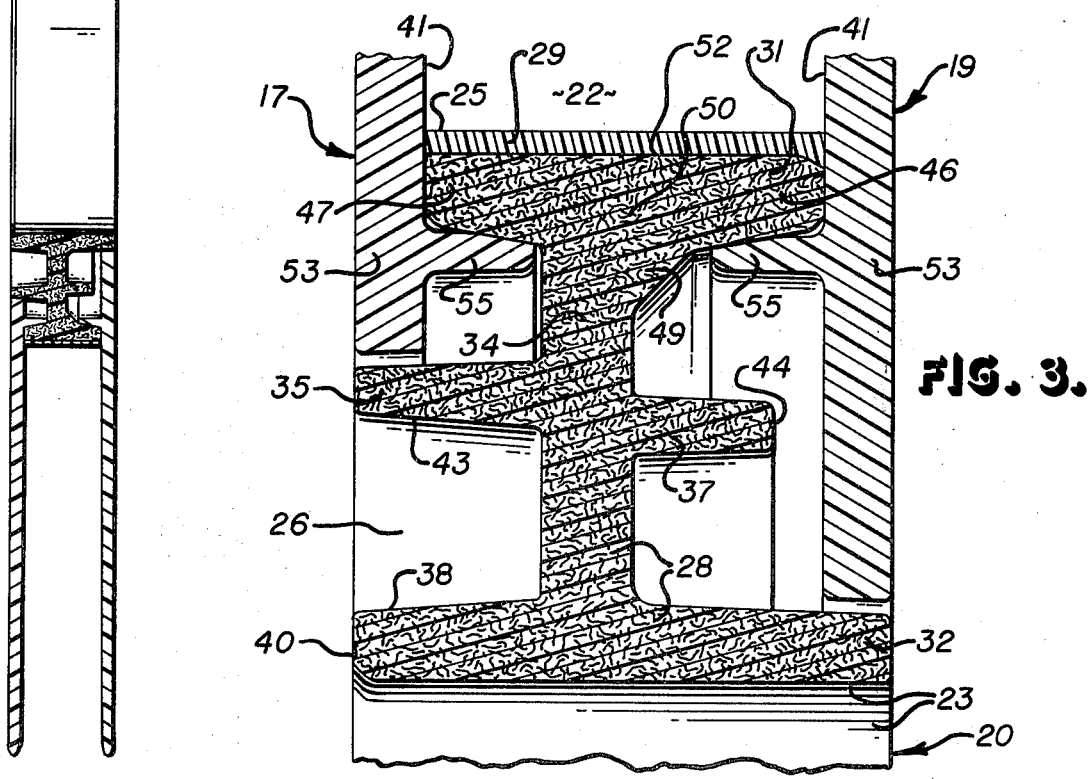

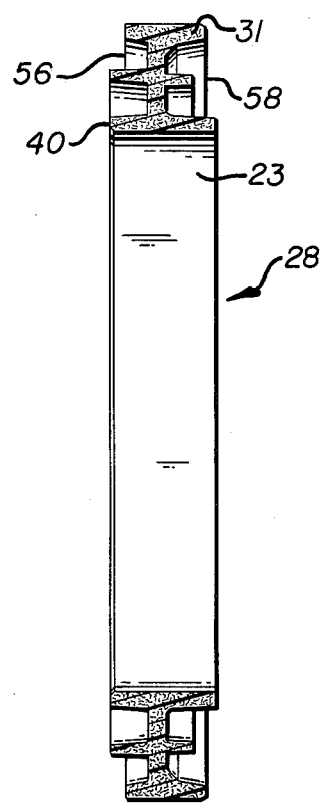
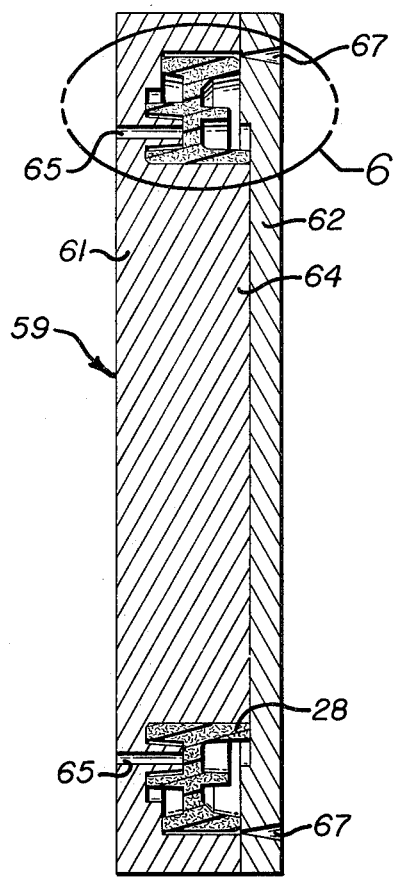
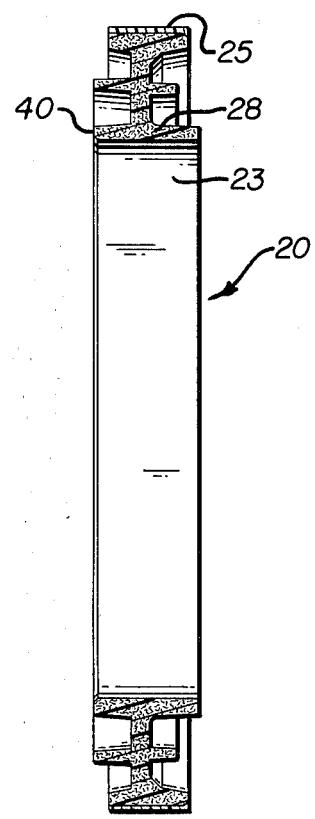
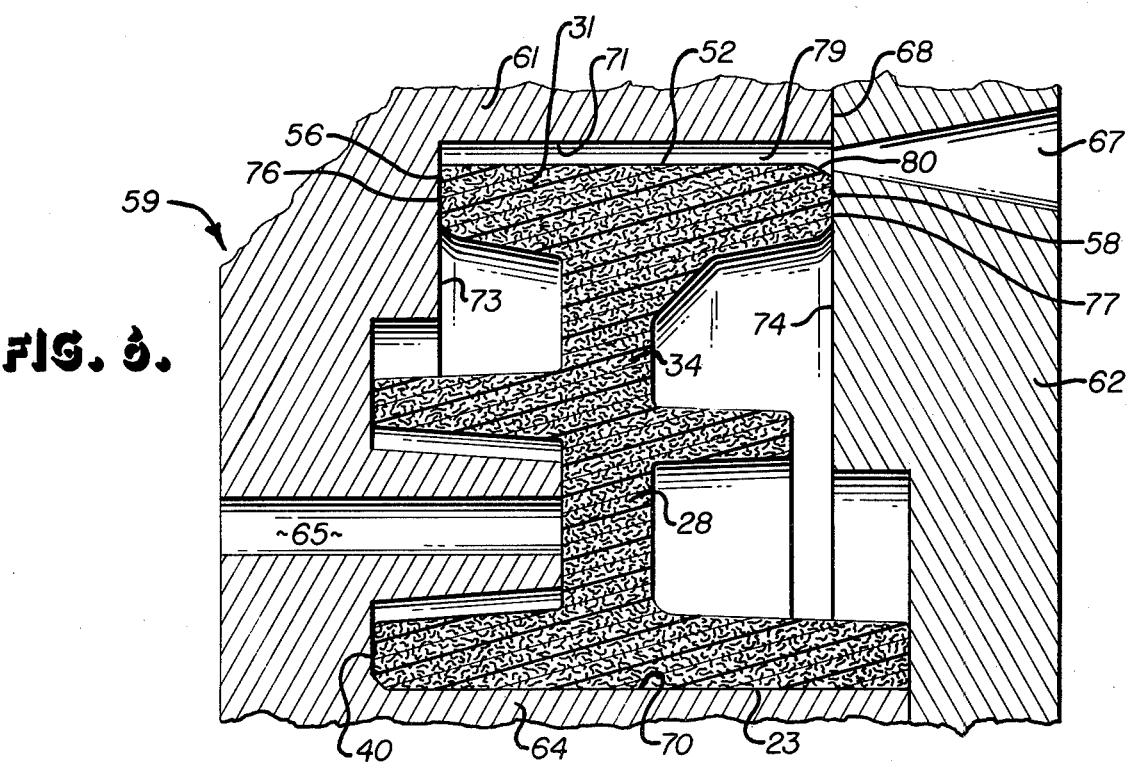

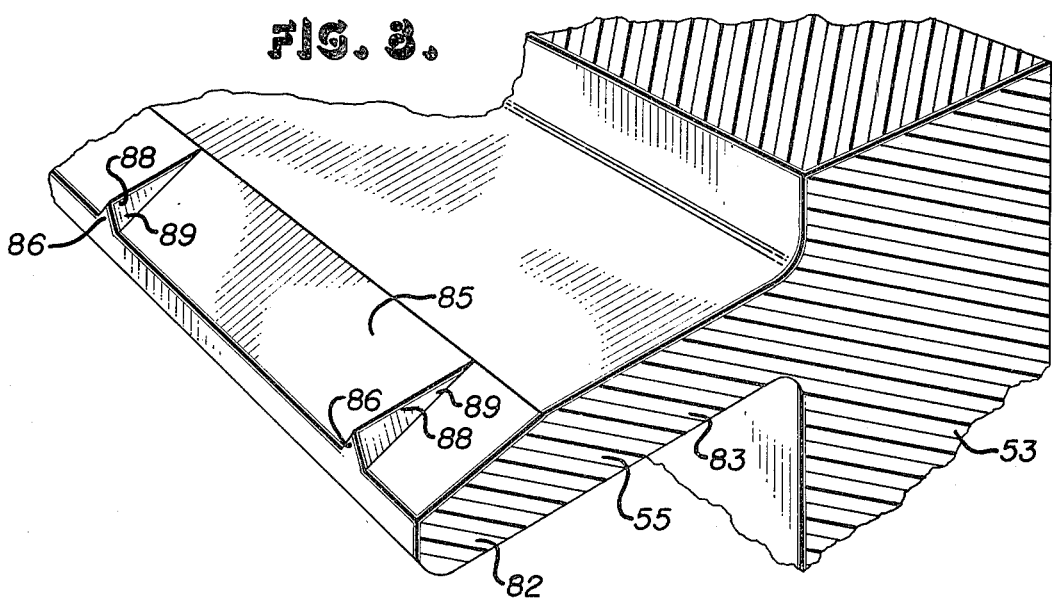
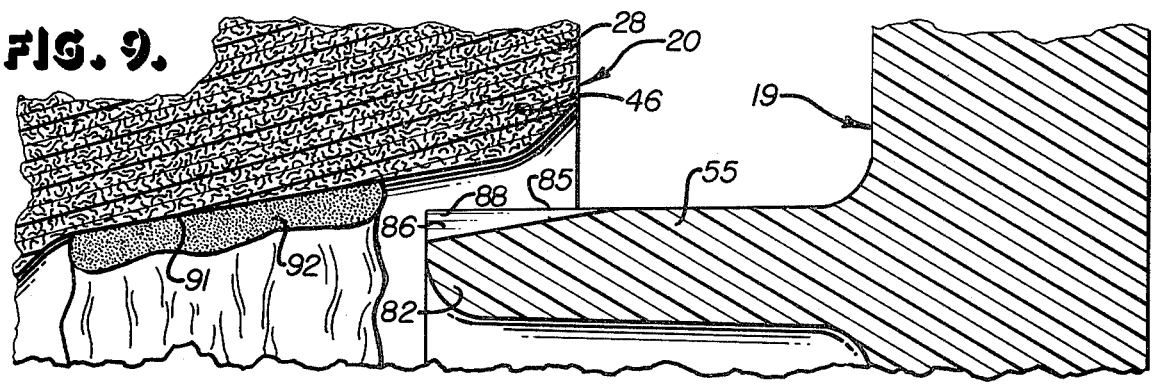
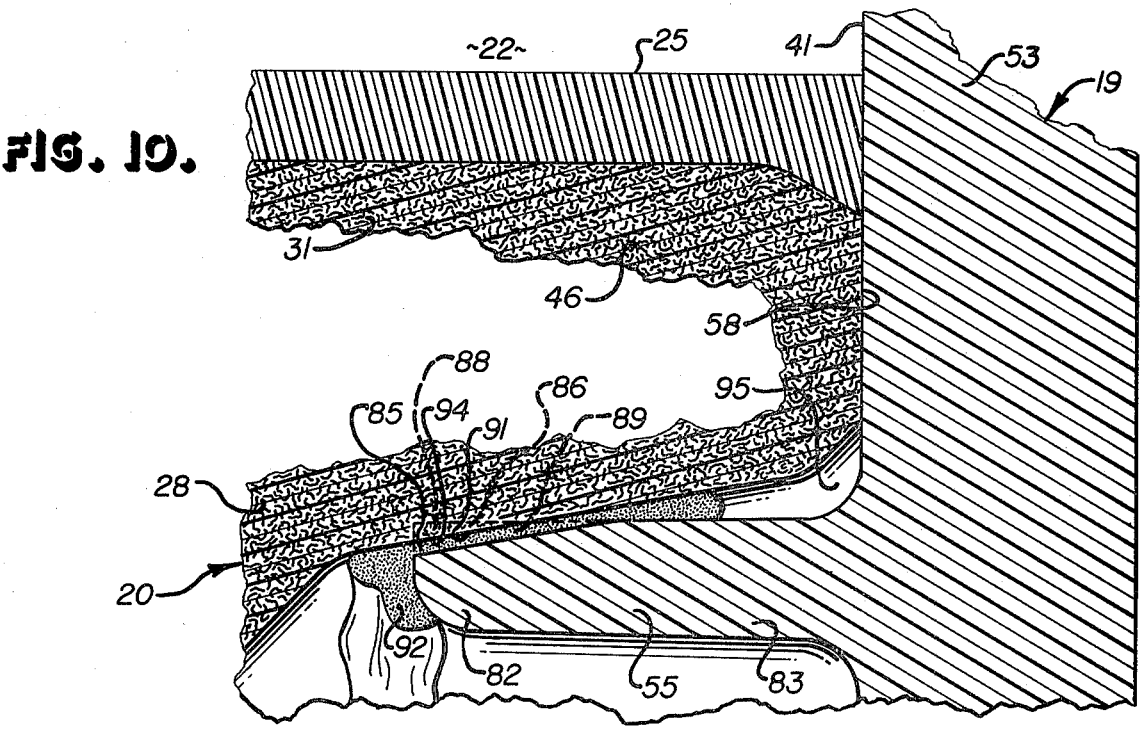

COMPUTER TAPE REEL

BACKGROUND OF THE INVENTION

A computer reel is like other reels in that it has a hub, two flanges and stores lengths of windable material. Aside from this rudimentary kinship, the computer reel is vastly set apart. It has evolved its separate way to meet the requirements of a market having unusual scientific and technical sophistication.

A computer reel is used to wind up and pay out magnetic tape in a tape drive system that typically has two reel mounting spindles, a write head, and a read head. To load, a full reel of tape is slipped over one spindle and an empty reel over the other. The end of the tape is threaded past the heads, moistened, and lowered to the hub of the empty reel, where the moistened tape will adhere sufficiently to permit enough winds to be laid down for a gird lock; and the course through which the tape is threaded and passes during the normal operation of the tape drive system may be conveniently referred to as a tape path.

When the drive is energized, the empty reel is torqued by its spindle, causing this reel to take up tape from the other reel, and a winding tension of 8 ounces is automatically maintained.

The system does not have a capstan drive as would be found in audio applications and so is capable of reeling tape at great speed, changing directions in a small fraction of a second. Further, as this tape is transferred back and forth between reels, it is in continuous frictional contact with the respective faces of the read and write heads.

CRITICAL CATEGORIES OF REQUIRED PERFORMANCE

Having outlined the basic interfaces between the reel and the computer, an examination of the computer reel itself now follows, broken down into five critical categories of required performance. They are: Table exactitude, centripetal load, temperature swings, rotary acceleration, and microscopic debris.

TABLE EXACTITUDE

The hub table is the outside cylindrical surface of the hub and serves as a precision supporting surface for computer tape. First, it must be precisely cylindrical; and second, it must be precisely coaxial with the bore of the reel. Such table exactitude is essential to the computer, for without it there will be a cyclic fluctuation in tape speed, capable of causing errors in writing onto the tape or in reading from the tape.

As a third aspect of hub table exactitude the table must be precisely perpendicular to the plane of the reel's mounting face, which is a lateral surface adjacent to the bore and serves to accurately locate the reel upon a spindle by stopping in flush abutment with a mating shelf. A lack of such perpendicularity will result in a geometrically defective stack and may subject the tape to edge damage.

No economically feasible combination of available manufacturing art with available reel will provide the degree of table exactitude now sought by the market.

CENTRIPETAL LOAD

Typically, in a full reel there are approximately 1300 winds of half-inch tape wound with an 8-ounce tension. The contact area between the hub and the wound tape is approximately 8 square inches. By physics, each wind, acting through those beneath it, will exert a centripetal force of approximately 0.062 pound per square inch upon the hub, for a total centripetal load of approximately 80 pounds per square inch. Further, to reduce computer access time and increase write/read accuracies, the computer industry is desirous of increasing winding tension. Yet even the mentioned 8-ounce tension has proved troublesome to the reel manufacturer. Because computer industry standards limit the hub to a small space envelope, many have found it particularly difficult to design a hub which will not intolerably compress or distort under the great load.

A more sophisticated inspection of centripetal load reveals that it is not distributed about the hub with perfect uniformity. If, for example, a combination of conditions occurs in which the table of the take up reel has a high order of exactitude, the table of the pay out reel is oval, and the outside diameter of wound tape upon the take up reel is equal to that of the pay out reel, then the pay out reel will project its table inexactitude upon the tension of the tape portion which spans the two reels and each rise and fall of tension will be transmitted to the wound tape of the take up reel.

Tape portions which are of greater-than-normal tension will be stacked along one diameter of the take up reel where they will generate an intensified centripetal load. Tape portions which are of less-than-normal tension will be stacked along a second diameter that is perpendicular to the first where they will generate a diminished centripetal load. Friction between the consecutive winds will prevent neutralization. This type of nonuniform load distribution tends to force the hub into ovality. Thus, it is imperative that the hub be strong enough and rigid enough to bear such nonuniform loads without suffering an intolerable degradation of table exactitude.

TEMPERATURE SWINGS

The normal conditions under which a reel is wound are 73° Fahrenheit and 8 ounces of tension. This applies when the reel is factory-filled; it applies when in use upon a computer; it applies to standardized test procedures. However, temperature will vary considerably during shipment and storage.

A reel's ability to withstand such environmental temperature variances is determined through a standardized test procedure. A full reel is entered into a test chamber, where its bore is loosely received so as to support the reel in its normal vertical orientation. The chamber will rise to 120° Fahrenheit and hold for 10 hours. This hot swing will then be followed by a cold swing in which the chamber drops to 40° Fahrenheit and is held for 10 hours. This completes one cycle. The reel is subjected to 15 cycles before it is removed. After allowing 24 hours for the reel to return to normal temperature, it is inspected for damage.

The kinds of damage which can result from the cycling of temperature are all subcategories of deformation. The hub, the flanges, and even the tape are subject to abuse. In any case, the deformation will stem from one or both of two sources: Cold flow and differential expansivity.

Cold flow is that trait of thermoplastics in which a large force applied through a long duration will cause deformation at temperatures well below the molding temperature; the greater the temperature, the greater the deformation. Thus it is during the ten hours at full hot swing that the reel is particularly vulnerable to cold flow. If, as in the discussion of centripetal load, the hub is carrying a nonuniform load which makes it somewhat oval, cold flow may permanentize this condition. In fact, under any abnormally high temperature such as this the hub structure will have less capacity to oppose an imbalanced load and may yield to a greater degree of ovality than possessed at normal temperature. Cold flow then acts to permanentize this greater state of distortion.

Differential expansivity is one of the most forceful sources of dimensional degradation. The expansivity of computer tape is fixed by factors outside of the reel manufacturer's control, and must be dealt with when designing the reel. Polystyrene has been a preferred material for both the hub table and the flanges, largely because it offers both economy and a smooth finish. Its expansivity, though, is thrice that of computer tape; and polystyrene is inadequately rigid to bear the required centripetal load. For this reason, when it is used to form the table, it is reinforced with an underlying annular load-bearing hub core, popularly formed of aluminum or glass-fibered styrene-acrylonitrile copolymer. Both of these materials have approximately the same expansivity as computer tape. As a result of the above practices two problems arise: Table-to-tape differential expansivity and flange-to-core differential expansivity.

Table-to-tape differential expansivity, exemplified in a reel having a hub table with an expansivity thrice that of the tape it must support, is a serious threat to the tape. During the hot swing, the table will expand at thrice the rate of the tape that is tightly wound upon it. The tape, especially that of the first few winds, is thrown into greater-than-normal tension, which it partially relieves through elongation. This has the effect of enlarging the inside circumference of the body of wound tape.

During the cold swing, the table constricts at a rate thrice that of the inside circumference of the wound tape, tending to leave in its wake an annular space. However, the centripetal load demands to be born and so will crush the inside winds into this space and down upon the table. Because the circumferences of these inside winds are greater than the corresponding circumferences of the portions of space that they must fill, wrinkling and other mechanical damage will occur. Also, during the succeeding temperature cycles, tape damage will itself beget tape damage.

Flange-to-core differential expansivity, exemplified in a reel in which each of the flanges has an expansivity thrice that of the hub core, is a serious threat both to the hub, the outside cylindrical surface or table of which derives its dimensional stability from the structural core, and to the flange.

The threat to the hub is due to the solidly attached flange. The flange, opposing the natural thermal dilation and constriction of the hub core, tends to distort the hub and to cause table inexactitude.

The threat to the flange is due to the solidly attached rigid hub core, which, opposing the natural thermal dilation and constriction of the flange, tends to warp the flange and force it to impinge upon the tape path. If cold flow should permanentize this warp, frictional interference with the smooth reeling of tape can result.

ROTARY ACCELERATION

When a computer is hunting through a tape for categories of information it imposes upon the reels unusually rapid rotary acceleration. This is necessary in order to reduce hunting time, which is a major expense in data processing. In 1 millisecond a reel is jolted from a standstill to as much as 7 revolutions per second.

In view of these conditions it is important that the weight of the reel be held to a minimum so that its rotary inertia will not impede the speed of the tape drive. Further, this intense rotary acceleration tends to shear the flanges off the hub. This tendency is magnified by the frequent sudden reversals of direction characteristic of the hunt. Accordingly, the reel's design must show considerable respect for these shearing forces.

MICROSCOPIC DEBRIS

All transfers of information between computer and tape can be made only through frictional contact between a tape and a matrix of very narrow transfer areas which are found upon the respective faces of the read and write heads. A microscopic piece of debris, carriable by the tape, is capable of spacing the tape sufficiently out of contact with the read and write heads to cause dropout, the nontransfer of one or more bits of information.

Thus, it is essential that the reel not shed upon the tape. Basically, this calls for the hub table and inside surfaces of the flanges to be of high-polish smoothness and fully free of dislodgable particles.

PRIOR ART

I am not familiar with any computer reel other than my own which fully meets the challenge of all five critical categories of required performance. The three U.S. Patents which are discussed below are among the most advanced publicly-disclosed proposals for computer reels. Further, they offer some of the finest analytical summaries of the design problems encountered. Through these examples some of the motivations and frustrations of this field of art are shown.

U.S. Pat. No. 3,327,960, issued to Hedin in 1967, discloses a reel with a monolithic hub of either aluminum or fibered plastic. For practical purposes, however, we must disregard aluminum. Aluminum hubs, though once popular, are being displaced with fibered plastic. The machining which they require prices them out of today's market. Further, in Hedin's reel if the aluminum option were employed, the tape would lie in direct contact with the aluminum, which is an excellent conductor of electricity. This subjects the tape to electromagnetic contamination effects. Since the above reasons show that the Hedin hub would preferably be made of fibered plastic, the remainder of this discussion of the Hedin reel assumes the use of this material.

This reel's capacity to withstand centripetal load is beyond question, for the hub is of good load-bearing material throughout. The reel's lightness together with an apparently adequate antishear arrangement should make it fit for rotary acceleration. Hub table exactitude, though, will fall short. Since the entire hub, with its necessarily-heavy walls, is molded in one piece, the hub table will have depressed areas resulting from the molding process. Further, the tape's exposure to microscopic debris will be unacceptable, for the tape must rest directly upon the fibrous surface of the hub, and these fibers are readily dislodgable.

Regarding temperature swings, the reel is of good design. There is no table-to-tape differential expansivity and therefore no problem in this regard. There is reason, however, to question its ability to meet the challenge of flange-to-core differential expansivity. On the positive side, it is not likely that there would be a problem of flange impingement. The hub is so positioned relative to the flanges and their attachments as to act as a spacer and thereby physically block such impingement. On the negative side, there is the possibility of flange-induced distortion of the hub, especially during a hot swing. Whether Hedin had resolved this is not apparent from the disclosure.

U.S. Pat. No. 3,410,500, issued to Elliott in 1968, presents a reel with many good qualities, attested to by the fact that it now dominates the world computer reel market. Unlike the Hedin reel, this reel does not have a monolithic hub. Instead, the hub is formed of a polystyrene outer portion, which provides a hub table, and an aluminum hub core, which serves as a supporting structure. The flanges are polystyrene. Additionally, in one embodiment of a currently-marketed Elliott reel the hub core is formed of fibered plastic rather than aluminum.

While a Hedin reel with an aluminum hub would pose the danger of electromagnetic contamination, an Elliott reel with an aluminum hub core would not. This is because the polystyrene which encircles the hub core holds the tape at a safe distance from this potential source of magnetic contamination.

Microscopic debris cannot be a problem, for even when the hub core is formed of fibered plastic, its fiber-clad surfaces are isolated from the tape due to the interposition of polystyrene. Nor can rotary acceleration be a problem. The reel is light and includes a satisfactory shear-prevention scheme.

Under centripetal load the reel could be expected to do well, though it would do significantly better if more of its hub were of good load-bearing material. Elliott's approach inscribes the hub core with two molded rings of polystyrene. This consumes a substantial portion of the tightly limited space envelope permitted for the hub, so that the strength-giving hub core must resign itself to a diminished cross section.

Table exactitude would be especially difficult to achieve. The hub table of this reel relies for its exactitude upon the precision of three separately formed parts. These parts sandwich together in such a way that their respective dimensional faults may accumulate and result in hub table inexactitude of unacceptable proportions.

The prelude to all three types of temperature swing problems is plainly visible in this design. First, since the hub table is formed as a polystyrene surface, table-to-tape differential expansivity will be present. Second, cold swings will constrict the polystyrene outer portion of the hub forcefully down upon the more slowly constricting hub core. This will distort the core and such distortion will be transmitted to the adjoining hub table. Third, during hot swings, the polystyrene flanges will tend to dilate, while being partly held back by the rigid and slow-to-dilate hub core. For this reason the flanges will have some tendency to impinge upon the tape path. Unlike the Hedin reel, this design does not include an impingement-blocking structure.

U.S. Pat. No. 3,794,258, issued to Posso et al. in 1974, proposes a reel which consists of only two components, and therefore promises economy. One of its flanges and the entire hub are molded in adjoinment, fibered plastic being the chosen material so that the hub will be strong. The outer flange is polystyrene and is solvent cemented to the hub.

Clearly, centripetal load would not be a problem. This reel, like the Hedin reel, has good load-bearing material webbed throughout the entire space envelope permitted for the hub. None of this space is displaced with material of lesser strength, as is the case in Elliott's reel. Further, this reel will meet the challenge of rotary acceleration: Its all-plastic construction makes it lightweight; its shear-prevention scheme is a plausible combination of mechanical locks and solvent bonds.

Posso has directed special attention to the consideration of temperature swings. Table-to-tape differential expansivity is directly avoided by using a hub that is fibered plastic throughout. Then again, he has innovated a special scheme to deal with the thermal consequences of the fact that his one polystyrene flange is bonded to the fibered plastic hub. This scheme includes an array of flexible fingers which project from this flange into the hub.

If this scheme is capable of fully absorbing differential expansion, the hub will not be subject to flange-induced distortion. Further, flange impingement is unlikely. The one flange which is of the same material as the hub is thereby immune to this problem. The other flange, even if inadequately cared for by the flexible fingers, will be blocked from impingement by the hub structure itself. The blocking is done by an arrangement similar to that proposed by Hedin.

Microscopic debris is the major drawback to this design. Not only is the hub table fibrous, but so is the entire inside face of the integral flange. However, were there a way to mold this flange-hub combination with a nonfibrous skin, this might rid the Posso reel of its inherent capacity to shed debris upon the tape.

Table exactitude will be a major problem in this reel for the same reason as in the Hedin reel. The heavy wall sections which must be utilized to fortify the hub against centripetal load will invite molding-induced depressions, sink marks, to form on the hub table.

In discussing these three specific computer reels, chosen because they represent the best of prior art, it is intended that the difficulty of the task of advancing this highly specialized field of technology will be apparent. It is the object of my invention to provide a computer tape reel which fully meets the challenge of all five stated critical categories of required performance.

SUMMARY OF THE INVENTION

Broadly speaking, my reel addresses the five critical categories in the following manner: To endure centripetal load it has a rigid hub core molded of fibered plastic. This core gains extra strength and rigidity by incorporating a deep I-beam section spanning all but a very small portion of the overall space permitted for the hub. Its wall thicknesses are especially heavy, with disregard for the sink depressions left upon its outside cylindrical surface.

Table exactitude is achieved by insert molding a thin sleeve of nonfibered somewhat elastic plastic, such as nylon, about the outside cylindrical surface of the preformed hub core. The insert mold accurately locates the hub core by snugly interfacing with the core's bore. The effect is that the exactitude of the hub table is dependent upon only this single, innately precise molding operation, and the possibility of tolerance stack up is therefore eliminated. Microscopic debris is not a problem, for the flanges of this reel are made of polystyrene and the sleeve, which is the only other surface with which computer tape can come into contact, is, as previously mentioned, made of nonfibered plastic.

The consideration of temperature swings is fully accounted for. First, the thin elastic sleeve will act to transmit the desirable expansional characteristics of the fibered plastic hub so that the expansivity of the hub table, which is the outside cylindrical surface of the hub sleeve, will match that of the computer tape which it will support. Second, the forces generated as a result of flange-to-core differential expansivity are harmlessly absorbed by a flange-to-core suspension system. The challenge of rotary acceleration is met by using all-plastic construction, which makes the reel lightweight, and by utilizing a flange-to-hub attachment scheme which is specifically oriented to the opposition of shear.

DESCRIPTION OF THE DRAWINGS

FIG. 1 is an elevational view of the rear side of a computer tape reel in accordance with my invention.

FIG. 2 is a diametrically sectioned view of the reel as shown in FIG. 1 taken on the plane of lines 2—2, alterations in the circumferential position of the viewing plane not affecting the view obtained.

FIG. 3 is an enlarged detailed view of area 3 of FIG. 2.

FIG. 4 is a diametrically sectioned view of the hub core as shown in FIG. 2 but in the absence of the other portions of the reel.

FIG. 5 is a diametrically sectioned view of a simplified insert mold in which the hub core as shown in FIG. 4 is confined but the injection of a hub sleeve about the core has not yet begun.

FIG. 6 is an enlarged detailed view of area 6 of FIG. 5.

FIG. 7 is a diametrically sectioned view of a completed hub as would be produced by the mold of FIG. 5 or as shown in FIG. 2 but in the absence of the other portions of the reel.

FIG. 8 is a perspective view of a fragment of a typical flange used with this reel similar to the two flanges shown attached to the hub in FIG. 3. This view details an annular flange tie which secures the flange to the hub.

FIG. 9 is a diametrically sectioned view of a portion of a reel as shown in FIG. 3 but in which one point in the assembly of the reel is depicted wherein a surface of the hub has been coated with cement and the illustrated flange has not yet been driven into place.

FIG. 10 is a view as in FIG. 9 but showing a consequent point in the assembly wherein the flange has been fully driven into place upon the hub.

DESCRIPTION OF THE INVENTION

The drawings illustrate a preferred embodiment of the invention together with a method for its manufacture. As especially seen in FIGS. 1 and 2 a generally circular reel 16 is comprised of a polystyrene annular rear flange 17 and a polystyrene annular front flange 19 both securely attached to an annular hub 20 thereby defining an annular tape housing space 22. The central bore 23 of the hub in particular and the reel in general is the inside cylindrical surface of the hub 20, is a right cylinder, and will fit snugly over a mating cylindrical surface of a computer tape drive spindle (not shown). A hub table 25 is formed as the outside cylindrical surface of the hub 20, is a right cylinder, and serves to receive winds of computer tape (not shown). An annular feeler switch channel 26 is found on the rear side of the reel.

A more detailed examination of the reel's various parts and their interrelationships may be made by reference to FIG. 3. Here again note the presence of the rear flange 17, front flange 19, hub 20, housing space 22, table 25, and channel 26; all of which elements are coaxial with each other in general and with the bore 23 in particular. It is seen that the hub is not monolithic but is comprised of an annular hub core 28 and a hub sleeve 29.

The hub core 28, which is the more massive of the two parts of the hub, is the major source of structural strength and dimensional stability for the hub in particular and the reel in general. It is specifically designed to be exceptionally strong and exceptionally rigid in order to successfully bear a heavy centripetal load which arises when the housing space 22 is filled with tape. The hub core 28 consists of a radially outermost annular portion or roof 31, a radially innermost annular portion or floor 32, an annular web 34 connecting the roof 31 to the floor 32, a rear midskirt 35 projecting rearward from the web 34, and a front midskirt 37 projecting forward from the web 34; all of which elements are coaxial with the bore 23.

The channel 26 serves as one part of a system (other parts of the system are not shown) for guarding housed tape against accidental erasure. When the channel 26 is open as shown, a feeler switch (not shown) which is mounted beside the spindle will recess into the channel 26 and prevent the computer from writing. An operator may close the channel 26 by placing a removable channel ring (not shown) therein (normally retained by an interference fit between the ring and the inside cylindrical surface 38 of the channel) so that the feeler switch will be barred from entering the channel 26 and will enable writing to occur. For this reason the channel ring is sometimes referred to as a write enable ring. Typically, if a reel of tape contains information which must be protected from the possibility of double recording or other accidental erasure, the person responsible for this protection will remove the channel ring from the channel 26.

A reel mounting face 40 is formed as a rear lateral flat surface of the hub and located adjacent to both the channel 26 and the bore 23, the plane of the mounting face lying perpendicular to the bore 23. In mounting the reel to a spindle the bore 23 allows the reel to pass down the length of the spindle until the mounting face 40 comes into flush abutment with a mating lateral shelf of the spindle. The effect of the abutment between the mounting face 40 and the shelf is to position the reel within the tape drive system such that tape will wind upon the reel in a substantially centered fashion to insure clearance between the edges of the tape and the inside lateral surfaces 41 of the two flanges.

The hub core 28 is injection molded of glass-fibered styrene-acrylonitrile copolymer, which offers some especially notable advantages. First, its expansivity is approximately equal to that of computer tape, which is a primary reason why the overall hub is able to avoid the problem of table-to-tape differential expansivity. Second, it is very strong and rigid, so that the hub core 28 will be exceptionally suited to resist deformation under centripetal load. Third, it is neither magnetic nor capable of culturing magnetic fields, insuring that the core 28 cannot be a source of magnetic contamination to the tape.

The cross-sectional geometry of the hub core 28 is specifically biased to meet the challenge of centripetal load. Particularly heavy wall thicknesses are used in the roof 31, the floor 32, and the interconnecting web 34 so that basically the hub core 28 is a stout I-beam in radical cross section, the web 34 appearing as the vertical member of the "I" and the roof 31 and the floor 32 appearing as the horizontal members of the "I". Also, this I-beam is especially deep, spanning almost the entire allowed hub space. Further, this I-beam cross section appears continuously about the circumference of the core 28 and is specifically free of web holes and other kinds of excavations which could undermine its inherent structural advantages. The combined effect of these geometric features is to give the core great strength and rigidity, especially under centripetal load.

The primary purpose of the rear midskirt 35 is to define the outside cylindrical surface 43 of the channel 26; but is also enhances the rigidity of the web 34. The major purpose of the front midskirt 37 is to enhance the moldability of the hub core 28. First, the front midskirt front lateral surface 44 serves as a preferable location at which the fibered plastic may be gated. Second, the front midskirt 37 substantially equalizes the surface area of the core's front side with that of the rear side, enabling a more balanced cooling of the core 28 and thereby avoiding warpage. In this way it tends to enhance the dimensional precision of the core 28. Additionally, the front midskirt 37, like the rear midskirt 35, braces the web 34.

To accommodate certain dimensional requirements imposed by the computer industry (especially the depth of the channel 26) and to avoid excessive thickness in the web 34 the roof front portion 46 extends further from the web 34 than does the roof rear portion 47. Without reinforement the longer front roof portion 46 would be significantly more susceptible to yielding beneath centripetal load than would the shorter rear roof portion 47. Accordingly, a stout annular reinforcement fillet 49, found on the front side of the core 28 between the web 34 and the roof 31, is included to fortify the front roof portion 46 by providing the portion 46 with a supplementary connection to the web 34.

It is interesting to note that the addition of the fillet 49 to the already heavy cross section of the roof 31 and web 34 results in an annular massive zone 50 in the central part of the roof 31. In molding the hub core 28, as the molten plastic of the massive zone 50 cools and solidifies, a sink valley (not shown) will thereby form in the outside cylindrical surface 52 of the hub core 28. The valley will extend about the entire circumference of the hub core 28 and will lie substantially coplaner with the massive zone 50. Were the surface 52 required to directly bear tape, as is taught by some proposed reels, such a valley would be intolerable, necessitating the elimination of the strength-giving fillet 49 and a reduction in the thickness of both the floor 31 and the web 34. The effect of these sacrifices would be a great loss in the hub's capacity to bear centripetal load.

These molding annoyances are uniquely resolved in my reel. Though stoutness in the roof 31, web 34, and fillet 49 is included, the appearance of sink depressions therefrom will not impair the table exactitude of the finished hub. Sink and any other surface imperfections of the outside cylindrical surface 52 of the hub core 28 are inconsequential for the simple reason that all of these imperfections become covered over with a thin layer of plastic during a secondary molding operation, the layer of plastic being the hub sleeve 29.

The hub core 28 could be formed from materials other than the particular fibered plastic which I have indicated to be preferable. For example, one might use other types of fibered plastics or similarly reinforced plastics or even metal, such as aluminum or magnesium. What is essential, however, is that the particular material chosen lend itself to the formation of a hub core that is very rigid and which bears well under heavy centripetal load.

The hub sleeve 29 is an elastically compliant thin layer of nonfibered plastic, which I prefer to form of nylon or other suitable somewhat elastic plastic. It is molded to the hub core 28 and covers the outside cylindrical surface 52 thereof. The special method which I have devised for molding the sleeve 29 to the core 28 insures that the hub table 25 will be of a high-polish smoothness, precisely cylindrical, precisely coaxial with the bore 23, and precisely perpendicular to the plane of the mounting face 40.

The hub sleeve 29 provides a host of values to the reel. First, the nonfibered plastic of the sleeve 29 shields the tape from the underlying fibered plastic. This prevents the hub core 28 from introducing microscopic debris into the housing space 22, so that the fibrous core 28 cannot contaminate housed tape with microscopic debris, which contamination could cause informational dropout.

Second, if for any reason it should become desirable to make the hub core 28 wholly or partially of metal—perhaps to cope with centripetal loads exceeding those now expected—the hub sleeve 29 will space the tape from the metal, countering the capacity of the metal to magnetically contaminate the tape.

Third, the use of a finalizing molding operation to form the hub sleeve 29, especially when done by the method which I will discuss later, gives the hub table 25 an exceptional dimensional exactitude of a degree seriously sought by the computer industry and not found in any other unmachined reel known to me.

Fourth, since the hub sleeve 29 serves to level out all surface imperfections and geometric inexactitude of the outside cylindrical surface 52 of the hub core 28—including molding sink, roughness, scratches, minor warpage, fibrosity, ovality, minor noncoaxiality with the bore 23, nonperpendicularity with the reel mounting face 40, and other dimensional aberrations—it permits the core 28 to be molded of fibered plastic and to be given a particularly heavy cross section. In so doing it allows the hub to assume such internal dimensions as will maximise the hub's capacity to bear centripetal load.

Fifth, because the hub sleeve 29 is thin and elastically compliant it does not diminish the values obtainable through the equality of expansivity between the hub core 28 and the computer tape. Rather it embraces the core 28, dilating compliably when the core 28 dilates, constricting with elastic memory when the core 28 constricts. In short, elastic compliance of the hub sleeve 29 gives the hub table 25 substantially the same expansivity as the hub core 28 and thereby substantially the same expansivity as the computer tape. Thus the sleeve 29 plays a vital role in preventing temperature-swing-induced mechanical damage to the tape.

Each of the flanges 17 and 19, which are preferably molded of polystyrene or other nonfibered plastic, is comprised of a disk-shaped flange body 53 and an annular flange tie 55 which is coaxial with the body 53 and projects hubward from the body 53. The tie 55 constitutes a structural basis for securely attaching the flange of which it is a part to the hub generally and the hub core 28 particularly. Though I prefer that the tie 55 be continuous about its circumference, it could just as well be discontinuous.

My method for manufacturing the hub of this reel can be clearly seen by reference to FIGS. 4 through 7. FIG. 4 depicts a hub core 28 which has been injection molded in a conventional manner and is a preform of a completed hub. Three aspects of dimensional precision, each of which is easily met by common manufacturing art, are given special attention in the molding of the hub core 28.

First, the bore 23 must be precisely cylindrical, though a very small draft angle (for improved molding) and minor surface imperfections such as web-induced sink are permissible. This precision of cylindricality enables the hub core 28 to be accurately centered within an insert mold as will soon be discussed. Also, since the bore 23 of the hub core 28 is one and the same as the bore of the completed hub, it is this surface which must fit accurately over a computer spindle to insure a snug and otherwise desirable mount. Also, hub table coaxiality is referenced to the bore 23 and thus dependent on the cylindrical precision of the bore 23.

Second, the width of the roof 31 (the distance from the roof's rear lateral surface 56 to the roof's front lateral surface 58) must be held to a particularly tight tolerance range. This is necessary in order to closely match this dimension with a mating dimension of an insert mold to seal a cavity to mold the hub sleeve, as will be more specifically explained later.

Third, the plane of the reel mounting face 40, the plane of the roof rear lateral surface 56, and the plane of the roof front lateral surface 58 must all be precisely perpendicular to the bore 23. This enables the core 28 to cooperate with respective mating surfaces of an insert mold and result in the attainment of precise perpendicularity between the plane of the mounting face 40 and the hub table.

Referring to FIGS. 5 and 6, an insert mold 59 is comprised of a mold body 61 and a mold cover 62. The body 61 has a centrally positioned cylindrical locating post 64 and ejection pin holes 65. The cover 62 has plastic injection gates 67.

To insert the hub core 28 into the mold 59 the cover 62 is opened, the bore 23 is brought into alignment with the mating post 64 and forced partially down thereupon, and the cover 62 is closed. As the cover 62 closes it forces particularly against the roof's front lateral surface 58, driving the hub core 28 down the post 64 until the cover 62 is stopped particularly by the flush cover-to-body interface 68 which lies radially outward from the core 28. The insert mold 59 is then clamped closed. The bore 23 and the post cylindrical surface 70 are diametrically very closely matched so that the core 28 will fit snugly upon the post 64 when the mold is fully closed.

At this point in the molding method the insert mold 59 contains the hub core 28 and is fully closed, awaiting the injection of plastic. It is this particular mold status which is depicted in FIGS. 5 and 6. Now is a good time to examine some of the mold's interior conditions.

The mold body 61 has a cylindrical table-forming surface 71 lying radially outward from the hub core's outside cylindrical surface 52. Owing to the exceptional accuracy attainable through machining, the table-forming surface 71 is precisely cylindrical and is precisely coaxial with the post 64 generally and the post cylindrical surface 70 specifically. Consequently, the table-forming surface 71 is precisely coaxial with the bore 23, for the bore 23 is snugly fit to the surface 70.

The roof 31 is entrapped between a mold body lateral surface 73 and a mold cover lateral surface 74. The mold 59 is dimensioned to insure that the distance between the two surfaces 73 and 74 will substantially equal the tightly-toleranced width of the roof 31 so that a body-to-roof interface 76 and a cover-to-roof interface 77 will both be substantially flush. Further, the plane of the body lateral surface 73 and the plane of the cover lateral surface 74 are both precisely perpendicular to the table-forming surface 71. But it will be recalled that the plane of the reel mounting face 40 and the planes of the roof lateral surfaces 56 and 58 are all precisely perpendicular to the bore 23. Thus by geometry the table-forming surface 71 is precisely perpendicular to the plane of the mounting face 40 which enables the table to acquire this same relationship with the plane of the mounting face 40.

A thin annular sleeve cavity 79 is defined by the hub core outside cylindrical surface 52, the table-forming surface 71, the mold body lateral surface 73, and the mold cover lateral surface 74. The roof 31 has an annular sleeve-gating excavation 80, preferably a chamfer, which is found at the intersection of the roof front lateral surface 58 and the hub core outside cylindrical surface 52. The sleeve-gating excavation 80 has been included in order to allow additional space for the gates 67. The shape and size of the excavation may be changed, so long as space requirements for gating the hub sleeve are adequately met.

Continuing with the method, molten plastic is now injected through the gates 67 to fill the sleeve cavity 79. This injection step is in several ways worthy of elaboration.

First, because the sleeve cavity 79 is unusually thin it tends to be difficult to fill. More specifically, I prefer that the thickness of the hub sleeve when taken on a lateral plane lying midway between its two sides be no less than 0.015 inch and no more than 0.060 inch, but most preferably 0.030 inch. This is one of various reasons why I prefer to form the sleeve of nylon. Molten nylon has an exceptionally low viscosity and so can be urged with low injection pressure to enter and distribute about the cavity 79 with relative ease.

Second, the pressurized molten plastic will find no exit from the sleeve cavity 79. The only zones which offer the plastic any promise of escape are the cover-to-body interface 68, the body-to-roof interface 76, and the cover-to-roof interface 77, all of which are arranged to be sufficiently flush to bar passage of the plastic. This is why it is particularly important that the width of the roof 31 be accurately controlled in the molding of the hub preform 28.

Third, because the sleeve cavity 79 is thin compared to the roof 31, the molten plastic which fills the cavity 79 will contain only a small amount of heat. The heat will be quickly drawn off especially by the mold body 61, which is cooled with fluid and is a good thermal conductor, so that neither the roof 31 nor the molten plastic will be degraded. In short, one reason the hub sleeve is made relatively thin when compared with the roof 31 in particular and the hub core 28 in general is to avoid thermally-induced degradation to the core 28 and the hub sleeve.

As the hub sleeve cools and solidifies its volume will slightly shrink, establishing an antirotation cinch lock to the core 28 and drawing the hub table 25 clear of any microscopic pockets which may exist in the table-forming surface 71. The lock makes the hub sleeve mechanically integral with the hub core 28.

This shrink phenomenon creates two very good reasons for making the hub sleeve out of plastic that is somewhat elastic. First, the elasticity enables the sleeve to accommodate its shrinkage by uniformly stretching rather than by fissuring. Secondly, the elasticity together with the sleeve's thinness limits the force of the cinch lock to an amount which though adequate to prevent rotary slip is not so much as to seriously contribute to the burden of centripetal load destined to be born by the hub core 28. Beyond the consideration of shrink it is specifically desired that the hub sleeve be elastically compliant to a sufficient degree to insure that the hub table possess an expansivity approximately equal to that of the hub core 28.

Though my preferred embodiment does not have a lock fortification means to further secure the hub sleeve against rotary slip relative to the hub core 28, such means may easily be included. For example, the hub core 28 may have a series of molded-in grooves distributed about its outside cylindrical surface 52 and parallel to its axis.

Once the hub sleeve is adequately cooled, the mold cover 62 is retracted and ejection pins (not shown) are passed through the ejection pin holes 65 and the completed hub is ejected from the mold body 61. As pointed out earlier the shrinkage of the sleeve manifests a clearance between the hub table and the table-forming surface 71. Owing to this clearance, the hub ejects smoothly and there is no need to provide draft on the table-forming surface 71, which draft would degrade the table exactitude. The gates 67 are preferably of such design as insures that the finished hub is free of gate leavings which extend beyond the plane of the roof's front lateral surface 58, enabling a flush assembly between flange and hub.

The product of the method is the hub 20, which may be viewed in FIG. 7 devoid of adjoinments. This unique method has been especially innovated and carefully tailored to produce a hub having to an optimized degree the unusual and highly specific combination of qualities expected of a hub that is for use in a computer tape reel per se. Some of the qualities are as follows: The hub table 25 is precisely cylindrical, precisely coaxial with the bore 23, precisely perpendicular to the plane of the reel mounting face 40, nonmagnetic, nongenerative of microscopic debris, and has an expansivity approximately equal to that of computer tape. And the hub, owing to the deep and massive cross section of strong and rigid material in its core 28, has an exceptional capacity to bear centripetal load.

Referring to FIGS. 8 through 10, the means for securely mounting the flanges to the hub 20 can be clearly viewed. Although only the front flange 19 is used in these illustrations, the discussion applies equally to the mounting of the rear flange.

Referring to FIG. 8, the annular flange tie 55 extends from the flange body 53. The tie 55 consists of a hubward annular thin compressible portion or compressible tie rim 82 and a counterhubward annular thin flexible portion or flexible tie arm 83, which connects the rim 82 to the body 53. The rim 82 is the tie's active element for effecting a bond of the flange to the hub. A flange bond surface 85 is formed as the radially outward surface of the tie rim 82 and is a truncated cone with its maximum diameter located adjacent to the tie arm 83.

Projecting radially outward from the flange bond surface 85 are sonic energy directors 86, each of which is of triangular cross section when viewed from a sectioning plane lying perpendicular to the axis of the flange and a vertex of this triangle is so positioned as to form a director ridge 88, which is the radially outward narrow portion of the director 86, and a director base 89, which is the remaining portion of the director 86. I prefer that the tie rim 82 have a total of 144 of the directors 86 spaced equally about its circumference, one every 2½ degrees of rotation.

FIG. 9 depicts one phase in the assembly operation. The flange tie 55 of the rear flange 19 is shown entering the core 28 of the hub 20. A hub bond surface 91 is formed as the radially inward surface of the roof front portion 46, the hub bond surface 91 being preferably a truncated cone with its maximum diameter located at its outer end, but more generally the hub bond surface 91 being dimensioned to mate with the flange bond surface 85. At this point in the assembly the hub bond surface 91 carries a coat of solvent cement 92, while the directors 86 are as yet unaltered.

Sonic energy is now applied to the flange 19, causing the directors 86 to undergo rapid oscillations. As the flange tie 55 progresses further inward upon the hub it will reach a point where the directors 86 will come into frictional engagement with the hub bond surface 91. This engagement will have two valuable effects.

First, the sonically oscillated directors 86 will vigorously rub the hub bond surface 91 and generate through friction a sufficient temperature to melt the director ridges 88 and the engaged portions of the hub bond surface 91. Once the flange has been fully driven upon the hub, the application of energy is stopped and the flange-to-hub molten interface quickly solidifies to form a sonic weld. In this way the directors 86 enable sonic welding of the flange bond surface 85 to the mating hub bond surface 91 to secure these surfaces against relative movement through the duration required for a solvent cement bond to set. Clamping, for example, is thereby made unnecessary.

Second, the engagement between the directors 86 and the hub bond surface 91 will closely coaxialize the flange 19 with the hub 20, which is a quality expected of a computer reel. To insure the most positive coaxialization I prefer there be at least three directors 86 equally spaced about the tie rim 82. Nevertheless, as few as two directors 86 could suffice to obtain a sonic weld and a fair degree of coaxiality.

FIG. 10 depicts the final configuration of the assembly operation. The flange inside lateral surface 41 has come into flush abutment with the hub core outside lateral surface 58 and the abutment is the means for halting the hubward progression of the flange, establishing a positive, accurate lateral alignment between the flange and the hub. The director 86 is drawn as though it were still in possession of its preassembly dimensions so that the magnitude of its interference with the hub bond surface 91 is in plain view.

As indicated earlier, sonic welding will melt the director ridges 88. It is, however, specifically intended that the director bases 89 will not melt but will serve as spacers between the flange bond surface 85 and the hub bond surface 91, providing a bond clearance 94 therebetween. In the interest of maximizing the strength of the solvent bond the magnitude of the clearance 94, which is accurately controllable in this embodiment, should be predetermined to store enough solvent cement 92 to thoroughly fuse the flange 19 to the hub but not so much solvent cement 92 as will weaken the desired bond through want of plastic content. Because the conditions for bonding are so optimized, the reel will have ample capacity to resist the shearing forces of rotary acceleration.

One reason I prefer polystyrene flanges in combination with a styrene-acrylonitrile copolymer hub core is that a strong solvent bond is easily achieved therebetween. But though I prefer solvent cement, because it provides a particularly strong and stable bond under the conditions of use in my reel, it is understood that any other suitable cement may be employed.

It has been pointed out that the attachment of a high-expansivity flange to a low-expansivity hub core can beget serious problems under wide temperature swings. Yet in the preferred embodiment of my invention a hub core of glass-fibered styrene-acrylonitrile copolymer must receive a flange which, because it is of polystyrene, has thrice the core's expansivity. Nevertheless, my reel is not troubled by temperature swings—It has a sophisticated flange-to-hub suspension system especially designed to prevent such temperature-swing-induced problems.

Two features of the suspension system are that the tie rim 82 is compressible and the tie arm 83 is flexible, these qualities owing to the fact that the flange tie 55 is made of polystyrene and is specifically formed as a thin and thus compliant member. Another feature of the suspension system is the annular expansion pocket 95 between the radially outward surface of the tie arm 83 and the adjacent surface of the hub, the pocket 95 serving to accommodate temperature-swing-induced flexings of the tie arm 83. To examine the manner in which these features combine together to obviate the effects of flange-to-hub differential expansivity let us first direct our attention to a hot swing.

In a hot swing the hub core 28 will expand very little compared with the flange 19. The expansion of the flange 19 will be limited at various points by the presence of the core 28, whereas it will at other points be free to expand without restriction. Roughly speaking, the result is that the compressible tie rim 82 will compress and the flexible tie arm 83 will flex.

More precisely however, all points along the flange tie 55 will both flex and compress—In the compressible tie rim 82 compression will predominate, while in the flexible tie arm 83 flexion will predominate. At the same time, the flange body 53 will expand freely and without distortion, accommodated in its expansion by the flexible tie arm 83, the expansion pocket 95, and the flat, slidability-oriented interface between the flange inside lateral surface 41 and the roof front lateral surface 58. Further, the very presence of this interface or abutment of the flange 19 against the roof front lateral surface 58 provides a safeguard to the integrity of the housing space 22, opposing any tendency of the flange 19 to impinge thereupon.

Because the roof front portion 46 is strong, rigid, and noncompliant compared with the compressible tie rim 82, it will not be distorted by the relatively low anticompression forces generated in the rim 82 and thus will not deliver inexactitude to the mechanically integral hub table 25.

In the case of a cold swing, the dynamics are very similar. Here however, the flange tie 55 will be forced to stretch rather than compress. Most of the stretching together with some flexing will occur in the compressible tie rim 82, while most of the flexing together with some stretching will occur in the flexible tie arm 83.

Though certain preferred forms of this invention have been described and illustrated herein, this invention is not intended to be limited strictly thereto, but is to comprehend the scope of the following enclosed claims.

What is claimed is:

1. An improvement in a computer reel of the type which stores magnetic tape and comprises an annular hub and two annular flanges coaxial with the bore of the hub and securely attached to the hub to define a tape housing space; said hub including a hub table formed as its outside cylindrical surface and a reel mounting face formed as a lateral surface adjacent to said bore and located on the rear side of the hub, which is the side that faces a mating drive spindle; and an annular feeler switch channel adjacent to said mounting face and coaxial with said bore; wherein the improvement is:

Said hub consisting of a rigid annular hub core, which is the hub's major source of structural strength and dimensional stability, and a hub sleeve, which is a thin layer of plastic insert molded to the core and covering the outside cylindrical surface thereof; the outside cylindrical surface of said core unavoidably possessing geometric inexactitudes such as ovality, noncoaxiality with said bore, and molding sink depressions; the inside cylindrical surface of said sleeve being insert molded against said core to mate with the outside cylindrical surface of the core and to conform to all of said geometric inexactitudes thereof; said table, which is the outside cylindrical surface of said sleeve, being insert molded independent of the outside cylindrical surface of said core and with said hub bore serving as the core's locating surface so that the sleeve levels out the geometric inexactitudes of the outside cylindrical surface of the core and the table is rendered precisely coaxial with the bore, precisely cylindrical, and free of intolerable sink depressions.

2. An improvement as defined in claim 1 wherein said hub core includes a radially outermost annular portion or roof, a radially innermost annular portion or floor, and an annular web connecting the roof to the floor; said roof, floor, and web are coaxial with said bore; and said hub core is basically an I-beam in radial cross section, said web appearing as the vertical member of the "I" and said roof and floor appearing as the horizontal members of the "I".

3. An improvement as defined in claim 1 wherein said hub core includes a radially outermost annular portion or roof, a radially innermost annular portion or floor, an annular web connecting the roof to the floor, a rear midskirt projecting rearward from the web, and a front midskirt projecting forward from the web; said roof, floor, web, rear midskirt, and front midskirt are coaxial with said bore; and said hub core is basically an I-beam in radial cross section, said web appearing as the vertical member of the "I" and said roof and floor appearing as the horizontal members of the "I".

4. An improvement as defined in claim 1 wherein said hub core includes a radially outermost annular portion or roof, a radially innermost annular portion or floor, and an annular web connecting the roof to the floor; said roof, floor, and web are coaxial with said bore; said hub core is basically an I-beam in radial cross section, said web appearing as the vertical member of the "I" and said roof and floor appearing as the horizontal members of the "I"; and on the front side of said hub core a stout annular reinforcement fillet between said web and said roof.

5. An improvement as defined in claim 1 wherein said hub core includes an annular sleeve-gating excavation, such as a chamfer, at the intersection of the outside cylindrical surface of the core and at least one of the lateral surfaces of the core, the excavation being specifically intended to help meet space requirements for gating said hub sleeve.

6. An improvement as defined in claim 1 wherein said hub sleeve is elastically compliant to a sufficient degree to insure that said hub table possess an expansivity approximately equal to that of said hub core.

7. An improvement as defined in claim 1 wherein each of said flanges consists of a disk-shaped flange body and an annular flange tie which is coaxial with the body and projects hubward from the body, the tie constituting a structural basis for securely attaching the flange of which it is a part to said hub.

8. An improvement as defined in claim 1 wherein the thickness of said hub sleeve when taken on a lateral plane lying midway between its two sides is no less than 0.015 inch and no more than 0.060 inch.

9. An improvement as defined in claim 1 wherein said hub core is molded of fibered plastic.

10. An improvement as defined in claim 1 wherein said hub sleeve is molded of nonfibered somewhat elastic plastic such as nylon.

11. An improvement as defined in claim 1 wherein said hub core is molded of glass-fibered styrene-acrylonitrile copolymer, said hub sleeve is molded of nylon, and said flanges are molded of polystyrene.

12. An improvement in a computer reel of the type which stores magnetic tape and comprises an annular hub and two annular flanges coaxial with the bore of the hub and securely attached to the hub to define a tape housing space; said hub including a hub table formed as its outside cylindrical surface and reel mounting face formed as a lateral surface adjacent to said bore and located on the rear side of the hub, which is the side that faces a mating drive spindle; and an annular feeler switch channel adjacent to said mounting face and coaxial with said bore; wherein the improvement is:
 each of said flanges consisting of a disk-shaped flange body and an annular flange tie which is coaxial with the body and projects hubward from the body, the tie constituting a structural basis for securely attaching the flange of which it is a part of said hub; said flange tie consists of a hubward annular thin compressible portion or compressible tie rim and a counter-hubward annular thin flexible portion or flexible tie arm, which connects the rim to said flange body; an annular expansion pocket; a flange-to-hub suspension system designed to prevent temperature-swing-induced problems stemming from a differential in expansivity which may exist between said hub and said flanges includes said compressible tie rim, said flexible tie arm, and said annular expansion pocket between the radially outward surface of the arm and the adjacent surface of the hub, the pocket serving to accommodate temperature-swing-induced flexings of the arm.

13. An improvement as defined in claim 12 wherein said hub core includes a radially outermost annular portion or roof, a radially innermost annular portion or floor, and an annular web connecting the roof to the floor; said roof, floor, and web are coaxial with said bore; said hub core is basically an I-beam in radial cross section, said web appearing as the vertical member of the "I" and said roof and floor appearing as the horizontal members of the "I"; a flange bond surface is formed as the radially outward surface of said compressible tie rim; said hub core includes two hub bond surfaces, one located on each side of the core; each of said hub bond surfaces is formed as the radially inward surface of that portion of said roof which lies on the relevant side of said hub core and is dimensioned to mate with at least one of said flange bond surfaces; and said flanges are securely attached to said hub by means of a solvent cement bond between said flange bond surfaces and the respectively adjacent hub bond surfaces.

14. An improvement as defined in claim 12 wherein said hub core includes a radially outermost annular portion or roof, a radially innermost annular portion or floor, and an annular web connecting the roof to the floor; said roof, floor, and web are coaxial with said bore; said hub core is basically an I-beam in radial cross section, said web appearing as the vertical member of the "I" and said roof floor appearing as the horizontal members of the "I"; a flange bond surface is formed as the radially outward surface of said compressible tie rim; said hub core includes two hub bond surfaces, one located on each side of the core; each of said hub bond surfaces is formed as the radially inward surface of that portion of said roof which lies on the relevant side of said hub core and is dimensioned to mate with at least one of said flange bond surfaces; said flanges are securely attached to said hub by means of a solvent cement bond between said flange bond surfaces and the respectively adjacent hub bond surfaces; said flange bond surface is a truncated cone with its maximum diameter located adjacent to said tie arm; each of said hub bond surfaces is a truncated cone with its maximum diameter located at its outer end; sonic energy directors project radially outward from said flange bond surface, each of the directors being of triangular cross section when viewed from a sectioning plane lying perpendicular to the axis of said flange, the directors enabling sonic welding of the flange bond surface to the mating hub bond surface to secure these surfaces against relative movement through the duration required for said solvent cement bond to set.

15. An improvement as defined in claim 12 wherein said hub consists of a rigid annular hub core, which is the hub's major source of structural strength and dimensional stability, and a hub sleeve, which is a thin layer of plastic molded to the core and covering the outside cylindrical surface thereof, and the sleeve being specifically formed and supported by the core so that said hub table is precisely cylindrical, precisely coaxial with said bore, precisely perpendicular to the plane of said reel mounting face, and nongenerative of microscopic debris.

16. An improvement in a computer reel of the type which stores magnetic tape and comprises an annular hub and two annular flanges coaxial with the bore of the hub and securely attached to the hub to define a tape housing space; said hub including a hub table formed as its outside cylindrical surface and a reel mounting face formed as a lateral surface adjacent to said bore and located on the rear side of the hub, which is the side that faces a mating drive spindle; and an annular feeler switch channel adjacent to said mounting face and coaxial with said bore; wherein the improvement is:

said hub consisting of a rigid annular hub core, which is the hub's major source of structural strength and dimensional stability, and a hub sleeve, which is a thin layer of plastic molded to the core and covering the outside cylindrical surface thereof, and the sleeve being specifically formed and supported by the core so that said hub table is precisely cylindrical, precisely coaxial with said bore, precisely perpendicular to the plane of said reel mounting face, and nongenerative of microscopic debris; said hub core includes a radially outermost annular portion or roof, a radially innermost annular portion or floor, and an annular web connecting the roof to the floor; said roof, floor, and web are coaxial with said bore; said hub core is basically an I-beam in radial cross section, said web appearing as the vertical member of the "I" and said roof and floor appearing as the horizontal members of the "I"; on the front side of said hub core a stout annular reinforcement fillet between said web and said roof; said hub sleeve is elastically compliant to a sufficient degree to insure that said hub table possess an expansivity approximately equal to that of said hub core; each of said flanges consists of a disk-shaped flange body and an annular flange tie which is coaxial with the body and projects hubward from the body, the tie constituting a structural basis for securely attaching the flange of which it is a part to said hub; said flange tie consists of a hubward annular thin compressible portion or compressible tie rim and a counterhubward annular thin flexible portion or flexible tie arm, which connects the rim to said flange body; a flange-to-hub suspension system designed to prevent temperature-swing-induced problems stemming from a differential in expansivity which may exist between said hub and said flanges includes said compressible tie rim, said flexible tie arm, and an annular expansion pocket between the radially outward surface of the arm and the adjacent surface of the hub, the pocket serving to accommodate temperature-swing-induced flexings of the arm; a flange bond surface is formed as the radially outward surface of said compressible rim; said hub core includes two hub bond surfaces, one located on each side of the core; each of said hub bond surfaces is formed as the radially inward surface of that portion of said roof which lies on the relevant side of said hub core and is dimensioned to mate with at least one of said flange bond surfaces; said flanges are securely attached to said hub by means of a solvent cement bond between said flange bond surfaces and the respectively adjacent hub bond surfaces; said flange bond surface is a truncated cone with its maximum diameter located adjacent to side tie arm; each of said hub bond surfaces is a truncated cone with its maximum diameter located at its outer end; sonic energy directors project radially outward from said flange bond surface, the directors enabling sonic welding of the flange bond surface to the mating hub bond surface to secure these surfaces against relative movement through the duration required for said solvent cement bond to set.

* * * * *